US006212387B1

(12) United States Patent
McLaughlin et al.

(10) Patent No.: US 6,212,387 B1
(45) Date of Patent: Apr. 3, 2001

(54) METHOD AND APPARATUS FOR COLLECTOR ARRAYS OF DIRECTIONAL ANTENNAS CO-LOCATED WITH ZONE MANAGERS IN WIRELESS COMMUNICATIONS SYSTEMS

(75) Inventors: Michael David McLaughlin, Saratoga; Kevin Dean Raack, Los Gatos; John Andrew Vastano, Santa Clara; John Walker Wallerius, Fremont; Bruce Denis Smith, Atherton; David Amundson Howard, Newark; Karen Evelyn Coates, San Jose, all of CA (US)

(73) Assignee: SC-Wireless Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/017,188

(22) Filed: Feb. 2, 1998

Related U.S. Application Data

(63) Continuation-in-part of application No. 08/866,700, filed on May 30, 1997, and a continuation-in-part of application No. 08/801,711, filed on Feb. 14, 1997, and a continuation-in-part of application No. 08/544,913, filed on Oct. 18, 1995, now Pat. No. 5,715,516, and a continuation-in-part of application No. 08/634,141, filed on Apr. 19, 1996, now Pat. No. 5,805,576, and a continuation-in-part of application No. 08/889,881, filed on Jul. 3, 1997.

(51) Int. Cl.[7] ............................................. H04Q 7/20
(52) U.S. Cl. ..................... 455/450; 455/562; 455/509; 455/137; 455/273
(58) Field of Search .................................... 455/132, 133, 455/134, 135, 136, 137, 138, 139, 446, 447, 449, 450, 451, 452, 561, 524, 272, 273, 279.1, 562, 509; 370/337, 328, 329, 334

(56) References Cited

U.S. PATENT DOCUMENTS 5,715,516 * 2/1998 Howard et al. ................... 455/524 X
5,805,576 * 9/1998 Worley, III et al. ................ 370/337
5,884,192 * 3/1999 Karlsson et al. ................. 455/137 X

* cited by examiner

Primary Examiner—Fan Tsang
Assistant Examiner—Philip J. Sobutka
(74) Attorney, Agent, or Firm—David E. Lovejoy

(57) ABSTRACT

The present invention is a communication system having a plurality of forward channel communications and a plurality of corresponding reverse channel communications in a region for communications with cellular users. Each region includes a plurality of zone managers. Each zone manager includes a broadcaster having a broadcaster transmitter for broadcasting a plurality of forward channel communications using broadband broadcaster signals to form a plurality of broadcaster forward channels. Each zone manager includes an aggregator for processing reverse channel communications. Each zone manager communicates with a collector group for receiving reverse channel communications from users and forwarding reverse channel communications to the aggregator. Each of the users includes a user receiver for receiving a different forward channel from said broadcaster and includes user transmitter means for broadcasting user reverse channel communications in a different user reverse channel. The collector group for each zone manager is formed of macro-diverse collectors some of which are located at other zone managers. By having collectors co-sited at zone manager sites, the macro-diverse collector operations are possible while reducing the installation cost of collectors.

4 Claims, 6 Drawing Sheets

1 …

METHOD AND APPARATUS FOR COLLECTOR ARRAYS OF DIRECTIONAL ANTENNAS CO-LOCATED WITH ZONE MANAGERS IN WIRELESS COMMUNICATIONS SYSTEMS

CROSS REFERENCES

This application is a continuation-in-part of application Ser. No. 08/866,700 filed on May 30, 1997 entitled METHOD AND APPARATUS FOR WIRELESS COMMNICATION EMPLOYING CONFIDENCE METRIC PROCESSING FOR BANDWIDTH REDUCTION, assigned to the same assignee as this application.

This application is a continuation-in-part of application SC/Serial No. 08/801,711 filed Feb. 14, 1997 entitled METHOD AND APPARATUS FOR WIRELESS COMMUNICATION EMPLOYING AGGREGATION FOR DIGITAL SIGNALS, assigned to the same assignee as this application.

This application is a continuation-in-part of application SC/Serial No. 08/544,913 filed Oct. 18, 1995 now U.S. Pat. No. 5,715,516 entitled METHOD AND APPARATUS FOR WIRELESS COMMUNICATION EMPLOYING COLLECTOR ARRAYS, assigned to the same assignee as this application.

This application is a continuation-in-part of application SC/Serial No. 08/634,141 filed Apr. 19, 1996 now U.S. Pat. No. 5,805,576 entitled METHOD AND APPARATUS FOR TDMA WIRELESS COMMUNICATION EMPLOYING COLLECTOR ARRAYS FOR RANGE EXTENSION, assigned to the same assignee as this application.

This application is a continuation-in-part of application SC/Serial No. 08/889,881 filed Jul. 3, 1997 entitled METHOD AND APPARATUS FOR WIRELESS COMMUNICATION EMPLOYING CONTROL FOR CONFIDENCE METRIC BANDWIDTH REDUCTION, assigned to the same assignee as this application.

This application is filed concurrently with the concurrent application METHOD AND APPARATUS FOR COLLECTOR ARRAYS IN WIRELESS COMMUNICATIONS SYSTEMS, assigned to the same assignee as this application assigned to the same assignee as this application.

BACKGROUND OF THE INVENTION

The present invention relates to the field of two-way wireless communications systems and more specifically to methods and apparatus using collector arrays in cellular sysems.

Cellular Systems

Present day cellular mobile telephone systems developed due to a large demand for mobile services that could not be satisfied by earlier systems. Cellular systems "reuse" frequency and other radio frequency (RF) resources within a group of cells to provide wireless two-way communication to large numbers of users. Each cell covers a small geographic area and collectively a group of adjacent cells covers a larger geographic region. Each cell has a fraction of the total amount of the RF spectrum or other resource available to support cellular users. Cells are of different sizes (for example, macro-cell or micro-cell) and are generally fixed in capacity. The actual shapes and sizes of cells are complex functions of the terrain, the man-made environment, the quality of communication and the user capacity required. Cells are connected to each other via land lines or microwave links and to the public-switched telephone network (PSTN) through telephone switches that are adapted for mobile communication. The switches provide for the handoff of users from cell to cell as mobile users move between cells.

In conventional cellular systems, each cell has a base station with RF transmitters and RF receivers co-sited for transmitting and receiving communications to and from cellular users in the cell. The base station transmits forward channel communications to users and receives reverse channel communications from users in the cell.

The forward and reverse channel communications use separate channel resources, such as frequency bands or spreading codes, so that simultaneous transmissions in both directions are possible. With separate frequency bands, this operation is referred to as frequency division duplex (FDD) signaling. In time division duplex (TDD) signaling, the forward and reverse channels take turns using the same frequency band. In code division duplex (CDD), the signaling is spread across a wide spectrum of frequencies and the signals are distinguished by different codes.

The base station in addition to providing RF connectivity to users also provides connectivity to a Mobile Telephone Switching Office (MTSO) or Mobile Switching Center (MSC). In a typical cellular system, one or more MTSO's (MSC's) will be used over the covered region. Each MTSO (MSC) can service a number of base stations (which are also known as Base Transceiver Stations (BTS) and associated cells in the cellular system and supports switching operations for routing calls between other systems (such as the PSTN) and the cellular system or for routing calls within the cellular system.

Base stations are typically controlled from the MTSO by means of a Base Station Controller (BSC). The BSC assigns RF carriers or other resources to support calls, coordinates the handoff of mobile users between base stations, and monitors and reports on the status of base stations. The number of base stations controlled by a single MTSO depends upon the traffic at each base station, the cost of interconnection between the MTSO and the base stations, the topology of the service area and other similar factors.

A handoff is a communication transfer for a particular user from one base station in one cell to another base station in another cell. A handoff between base stations occurs, for example, when a mobile user travels from a first cell to an adjacent second cell. Handoffs also occur to relieve the load on a base station that has exhausted its traffic-carrying capacity or where poor quality communication is occurring. During the handoff in conventional cellular systems, there may be a transfer period of time during which the forward and reverse communications to the mobile user are severed with the base station for the first cell and are not yet established with the second cell.

Cellular Architectures

In wireless systems, both physical channels and logical channels exist where logical channels carry signaling data or user data that is mapped onto physical channels. In cellular systems, traffic channels are logical channels for user data and are distinguished from control channels that are logical channels for network management messages, maintenance, operational tasks and other control information used to move traffic data reliably and efficiently in the system. In general, the term channels refers to logical channels unless the context indicates otherwise and those logical channels are understood to be mapped to physical channels. The control channels process the access requests of mobile users.

Conventional cellular implementations employ one of several techniques to allocate RF resources from cell to cell over the cellular domain. Since the power at a receiver of a radio signal fades as the distance between transmitter and receiver increases, power fading is relied upon to enable RF resource reuse in cellular systems. In a cellular system, potentially interfering transmitters that are far enough away from a particular receiver, and which transmit with acceptable transmission parameters, do not unacceptably interfere with reception at the particular receiver.

In a frequency division multiple access (FDMA) system, a communications channel consists of an assigned frequency and bandwidth (carrier). If a carrier is in use in a given cell, it can only be reused in other cells sufficiently separated from the given cell so that the other cell signals do not significantly interfere with the carrier in the given cell. The determination of how far away reuse cells must be and of what constitutes significant interference are implementation-specific details.

In a time division multiple access (TDMA) system, time is divided into time slots of a specified duration. Time slots are grouped into frames, and the homologous time slots in each frame are assigned to the same channel. It is common practice to refer to the set of homologous time slots over all frames as a time slot. Typically, each logical channel is assigned a time slot or slots on a common carrier band. The radio transmissions carrying the communications over each logical channel are thus discontinuous in time. The radio transmitter is on during the time slots allocated to it and is off during the time slots not allocated to it. Each separate radio transmission which occupies a single time slot is called a burst. Each TDMA implementation defines one or more burst structures. Typically, there are at least two burst structures, namely, a first one for the user access request to the system, and a second one for routine communications once a user has been registered. Strict timing must be maintained in TDMA systems to prevent the bursts comprising one logical channel from interfering with the bursts comprising other logical channels in adjacent time slots.

One example of a TDMA system is a GSM system. In GSM systems, in addition to traffic channels, there are four different classes of control channels, namely, broadcast channels, common control channels, dedicated control channels, and associated control channels that are used in connection with access processing and user registration.

In a code division multiple access (CDMA) system, the RF transmissions are forward channel communications and reverse channel communications that are spread over a wide spectrum (spread spectrum) with unique spreading codes. The RF receptions in such a system distinguish the emissions of a particular transmitter from those of many others in the same spectrum by processing the whole occupied spectrum in careful time coincidence. The desired signal in an emission is recovered by de-spreading the signal with a copy of the spreading code in the receiving correlator while all other signals remain fully spread and are not subject to demodulation.

The CDMA forward physical channel transmitted from a base station in a cell site is a forward waveform that includes individual logical channels that are distinguished from each other by their spreading codes (and are not separated in frequency or time as is the case with GSM). The forward waveform includes a pilot channel, a synchronization channel and traffic channels. Timing is critical for proper de-spreading and demodulation of CDMA signals and the mobile users employ the pilot channel to synchronize with the base station so the users can recognize any of the other channels. The synchronization channel contains information needed by mobile users in a CDMA system including the system identification number (SID), access procedures and precise time-of-day information.

Spread spectrum communication protocols include but are not limited to CDMA as well as Frequency Hopping and Time Hopping techniques. Frequency Hopping involves the partitioning of the frequency bandwidth into smaller frequency components, which a channel then uses by hopping from one frequency component to another in an essentially random manner. Interchannel distortion acts essentially as Gaussian white noise across time for each channel. Time Hopping involves a time division scheme wherein each channel starts and stops at differing time slots in an essentially random fashion. Again, interchannel distortion acts essentially as Gaston white noise across time for each channel.

Applicable communications protocols of this patent include but are not limited to FDMA, TDMA, and spread spectrum techniques, as well as protocols employing techniques of more than one of FDMA, TDMA and spread spectrum techniques.

Many cellular systems are inherently space division multiple access (SDMA) systems in which each cell occupies and operates in a zone within a larger region. Also, cell sectoring, microcells and narrow beam antennas all employ spacial divisions that are useful in optimizing the reuse of RF resources.

Space Diversity

The combining of signals from a single source that are received at multiple spaced-apart antennas is called space diversity. Micro-diversity is one form of space diversity that exists when two or more receiving antennas are located in close proximity to each other (within a distance of several meters for example) and where each antenna receives the signals from the single source. In micro-diversity systems, the received signals from the common source are processed and combined to form an improved quality resultant signal for that single source. Micro-diversity is effective against Rayleigh or Rician fading or similar disturbances. The terminology micro-diverse locations means, therefore, the locations of antennas that are close together and that are only separated enough to be effective against Rayleigh or Rician fading or similar disturbances. The signal processing for micro-diverse locations can occur at a single physical location and hence micro-diversity processing need not adversely impact reverse channel bandwidth requirements.

Macro-diversity is another form of space diversity that exists when two or more receiving antennas are located far apart from each other (at a distance much greater than several meters, for example, several kilometers) and where each antenna receives the signals from the single source. In macro-diversity systems, the received signals from the single source are processed and combined to form an improved quality resultant signal for that single source. The terminology macro-diversity means that the antennas are far enough apart to have de-correlation between the mean signal levels for signals from the single source. The terminology macro-diverse locations means, therefore, the locations of antennas that are far enough apart to achieve that de-correlation. Macro-diversity processing involves forwarding of signals to a common processing location and hence consumes communication bandwidth.

The mean signal levels in macro-diversity systems are de-correlated because each separate signal path has unique propagation properties that diminish the signal strength. The propagation properties in each path are different from those in each other signal path. These unique propagation properties vary with distances above Rayleigh or Rician fading distances and are due to terrain effects, signal blocking by structures or vegetation and other similar environmental factors. Fading due to such factors is referred to as shadow fading. De-correlation distances for shadow fading may be just above Rayleigh fading distances and may be as large as several kilometers.

User Location In Cellular Systems

In cellular systems, equipment and functions are distributed over zones, cells, and other coverage areas. In order to control and operate cellular systems efficiently, information about the location of active users in the system is increasingly important.

In conventional cellular systems, the user location information that has been used has included the cell, or sector of a cell, in which a user is located. The location of a user in a cellular system is important because of the fading of signals as a function of the distance of a receiver from a transmitter. Although increases in broadcast power can be used at greater distances between broadcasters and receivers, such increases tend to cause reception interference by other receivers and hence tend to reduce the user capacity of the system. Accordingly, cellular systems balance RF resources in order to optimize parameters that efficiently establish good system performance.

Covering Region Edges And Small Shadow Terrain

In the cross-referenced concurrent application, a region is covered by a combination of base station (XTSs) zone managers working together with neighboring XTS zone managers for supporting mobile uses. When there are no other neighboring XTS zone managers, the mobile user is said to be operating at the edge of a region since there is only one XTS available to support mobile communications. In certain regions, especially rural regions, the amount of area which is "inside the region" with neighboring XTSs may be small in comparison to the area served which are on the edge of the region, or supported by one XTS only. As a result, it is valuable to develop a superior coverage solution for areas in edge conditions (and possible center area conditions as well) in order to support mobile regions while using less sites than other solutions.

Conversely, there may be region configuration scenarios when the amount of obstacles to the rf signals to and from mobile stations to the base stations are small throughout most of the targeted cell areas. An extreme example of this is the Utah desert's salt flats. Other less extreme examples apply.

In conditions where the terrain and potential radio shadow interference is small and consistent throughout the area, the operator may derive some—but little—benefit from reducing these small shadows via multi-site RX detection, region collaboration, and signal aggregation. The net gain in area covered from this approach should certainly be smaller in small shadow variation cells compared with cell areas which have large variations in the shadow (and non-shadow) areas throughout the cell. All of the simulations which we have performed at Spectrum Wireless confirm the resulting gains and losses associated with variations in the log-normal distribution of rf variations across a cell when macroscopic diversity is employed to serve an area.

Prior Approaches

Base Station equipment comprises the radio frequency equipment (or radios) of a cell site. This equipment is typically configured so that the signal to the mobile (the forward channel) is transmitted (TX) from the base station via an antenna which is designed to cover the entire area around the base station or a subset of the area—a sector. A symmetrical design for the area of served by the receiver portion of the radio which detects signals from the mobile user's phone to the base station (the reverselink) is then used in order to support the mobile user as the move about the targeted area.

The definition of the forward channel TX area and the reverse channel RX area served by one or more antennas at the base station is the same, so that mobile users will be able to both receive signals from the base station throughout the target sector as well as transmit signals which are successfully received by the base station throughout the targeted area (sector). The base station supports a transceiver design, which uses the same (or similarly shaped antenna patterns) to both transmit and receive signals.

The problem associated with increases in capacity of cellular systems have created a need for improved methods and apparatus for use in wireless mobile communication systems.

SUMMARY OF THE INVENTION

The present invention is a communication system having a plurality of forward channel communications and a plurality of corresponding reverse channel communications in a region for communications with cellular users. Each region includes a plurality of zone managers. Each zone manager includes a broadcaster having a broadcaster transmitter for broadcasting a plurality of forward channel communications using broadband broadcaster signals to form a plurality of broadcaster forward channels. Each zone manager includes an aggregator for processing reverse channel communications. Each zone manager communicates with a collector group for receiving reverse channel communications and forwarding reverse channel communications to the aggregator. Each of the users includes a user receiver for receiving a different forward channel from said broadcaster and includes user transmitter means for broadcasting user reverse channel communications in a different user reverse channel.

In the present invention, the area served by an antenna for the forward channel is not the same as the area served by the antennas used in the reverselink. The mobile user by having more reverselink sectors which are smaller in area than the forward channel sectors serving the same mobile. The zone manager detects signals from multiple antennas which are located together with the zone manager equipment and which are then combined together via the aggregation process so that the mobile's signal will be 'balanced' with the forward channel signal.

The forward channel signal is successfully detected by the mobile users because the power used in the forward channel is greater than is traditionally used. Even though the gain of the forward channel antenna is lower than that of the reverselink antennas, the energy is transmitted over the necessary distance via increased power.

Antenna gain of the forward channel omni (360 degrees) is approximately 14 dB, with special omni antennas. The antenna gain of each reverselink (45 degrees) with special antennas is approximately 22 dB—an 8 dB improvement. This means that the power amplifier must be 8 dB stronger for the forward channel than conventional omni systems.

Of course, we could configure 60 degree antennas if the reverselink is sectored six ways (360 degrees divided by 6 ways=60 degrees). However, antennas are defined to be 3 dB down at the edge of their coverage area. In many cases, the antennas will detect signal at some level when off of the edge—although the signals will be a bit weaker. In these cases, it is likely that the neighboring sector associated with a collector will also detect a portion of the signal, and a gain will be derived via the aggregation processes to offset the lack of absolute overlap.

In this configuration, six collectors are configured in the zone manager and each is associated with a narrow, high-gain antenna. Each collector's output is then used in the six-way aggregation in order to detect in high-quality, the mobile user's signal.

This same sectoring of the reverselink applies in many other scenarios, including more or less sectors for an omni forward channel, as well as sectoring an reverselink area within a sectored forward channel area. In this condition, a sectored cell with three sectors of forward channel could have nine collectors, each with 30 degree antennas dividing up the 120 sectors used in the forward channel. In this way 5 dB or more of gain can be acheived via asymmetrical antenna gains (through aggregation) and increased forward channel power to balance the forward channel.

The collector group for each zone manager is formed of macro-diverse collectors some of which are located at other zone managers. By having collectors co-sited at zone manager sites, the, macro-diverse collector operations are possible while reducing the installation cost of colletors The problem associated with increases in capacity of cellular systems have created a need for improved methods and apparatus for use in wireless mobile communication systems.

DETAILED DESCRIPTION

Figure 1:
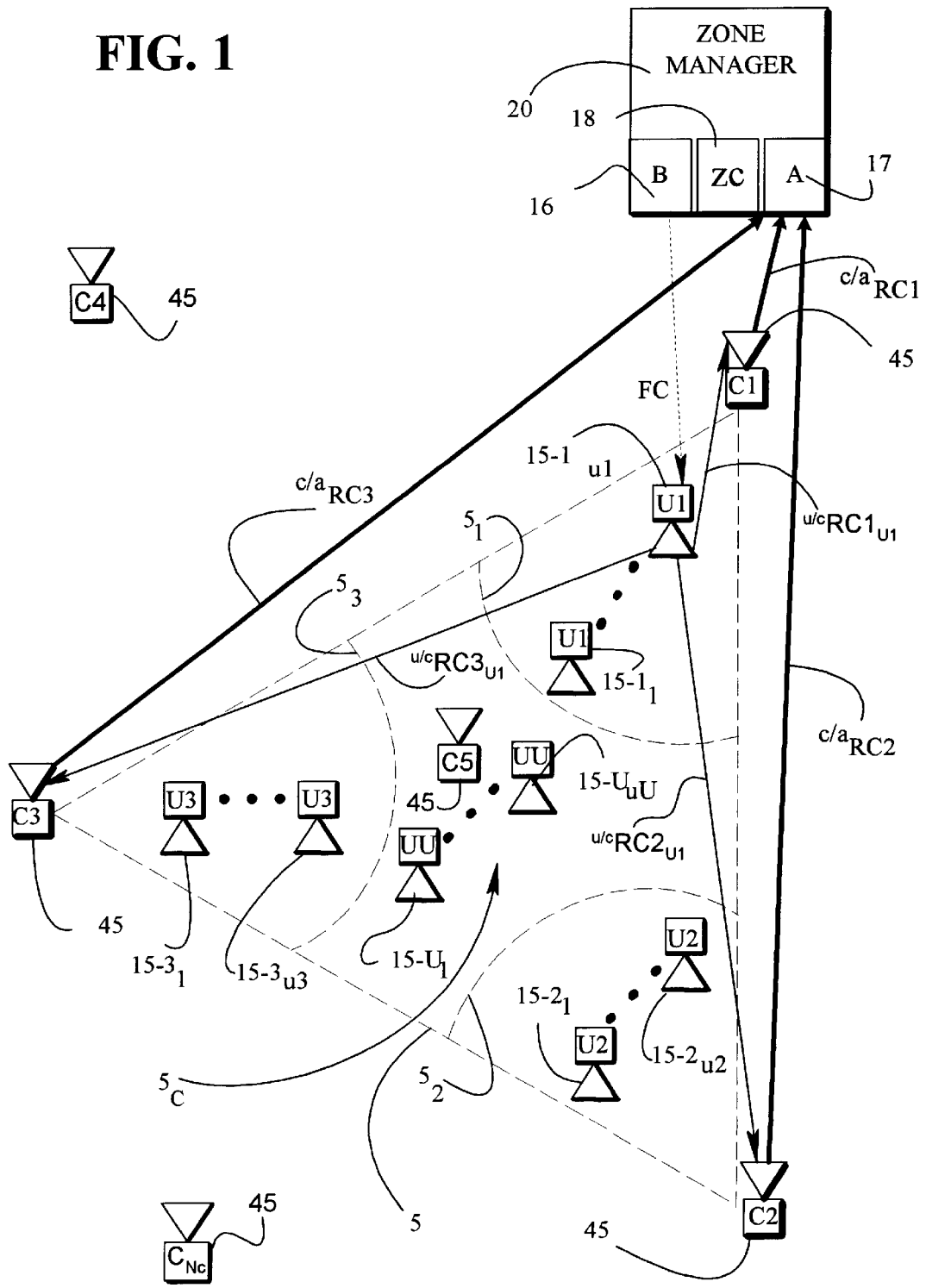
FIG. 1 depicts a communication system for wireless users employing macro-diverse collectors for receiving user access requests for processing and forwarding to an aggregator for combining.

Cellular System—FIG. 1

In FIG. 1, a cellular system is shown having a zone manager 20 that includes broadcaster (B)16, aggregator (A)17 and zone control (ZC) 18. The broadcaster 16 broadcasts forward channel (FC) communications from broadcaster 16 to multiple users 15 including users U1, U2, ..., UU located within a broadcaster zone 5 designated by the dashed-line triangle. The users 15 can be at fixed locations or can be mobile. Each of the multiple users 15 transmits reverse channel (RC) communications to one or more of multiple collectors 45 including collectors C1, C2, C3, C4, C5, ..., $C_{NC}$ which, when active, in turn forward the reverse channel communications to aggregator 17 in zone manager 20. The broadcaster 16, the aggregator 17 and the zone control 18 can be co-sited or at different locations. The determination of which ones of the collectors 45 are active for any particular user 15 is under control of zone control 18. Zone control 18 operates to select active collectors based upon bandwidth availability, signal quality and other system parameters. For purposes of explanation in this application, it is assumed that collectors C1, C2 and C3 have been selected for user U1.

Each of the users 15 has a receiver for receiving broadcasts on the forward channels from the broadcaster 16. Also, each of the users 15 has a transmitter that transmits on reverse channels to the collectors 45. The collectors 45 are sited at macro-diverse locations relative to each other generally within broadcaster zone 5. Therefore, multiple copies of macro-diverse reverse channel communications are received at the aggregator 17 for each user 15.

In the FIG. 1 system, when any user 15 is turned from off to on in zone 5, an access protocol is followed in order that the user becomes recognized and registered for operations in the system. First, an orientation procedure is followed by user 15 to orient the user to zone manager 20 and any connected network such as the Public switched telephone network (PSTN). The user receives access synchronization signals from the broadcaster 16.

When a user 15 is turned from off to on in a broadcaster zone 5 and the orientation procedure has been followed, the user 15 sends access request bursts on an access reverse channel. Each burst includes a predetermined access request sequence of bits.

The collectors 45, distributed at macro-diverse locations, are time synchronized and receive the reverse channel signals with access request bursts from the users 15. The access requests from the users received at the macro-diverse collectors 45 are processed and forwarded to an aggregator 17 for final user registration processing.

In FIG. 1, the U1 user 15 is typical and receives forward channel (FC) communications including access sychronization information from broadcaster 16. The user 15 also forwards user-to-collector reverse channel communications ($^{u/c}$RC) including user access requests to each of the collectors 45 and particularly to the active collectors C1, C2 and C3. Each of the active collectors C1, C2 and C3 for U1 forwards collector-to-aggregator reverse channel communications ($^{c/a}RC_{U1}$) to aggregator 17. The reverse channel communications from the U1 user 15 include the user-to-collector communication $^{u/c}RC1_{U1}$ and the collector-to-aggregator communication $^{c/a}$RC1, the user-to-collector communication $^{u/c}$RC2 and the collector-to-aggregator communication $^{c/a}$RC2 and the user-to-collector communication $^{u/c}RC3_{U1}$ and the collector-to-aggregator communication $^{c/a}$RC3. Each of the other users U2, ..., UU in FIG. 1 has similar forward channel communications that include access synchronization signals and reverse channel communications that include user access requests.

In FIG. 1, the U1 users $15\text{-}1_1, \ldots, 15\text{-}1_{u1}$ are all located in a subregion bounded by the collector C1 and the arc $5_1$ and hence are in close proximity to the collector C1. Because of the close proximity, the signal strength of the reverse channel transmissions from the U1 users $15\text{-}1_1, \ldots, 15\text{-}1_{u1}$ to collector C1 is normally high. Similarly, the U2 users $15\text{-}2_1, \ldots, 15\text{-}2_{u2}$ are all located in a subregion bounded by the collector C2 and the arc $5_2$ and hence are in close proximity to the collector C2. Because of the close proximity, the signal strength of the reverse channel transmissions from the U2 users $15\text{-}2_1, \ldots, 15\text{-}2_{u2}$ to collector C2 is normally high. The U3 users $15\text{-}3_1, \ldots, 15\text{-}3_{u3}$ are all located in a subregion bounded by the collector C3 and the arc $5_3$ and hence are in close proximity to the collector C3. The signal strength of the reverse channel transmissions from the U3 users $15\text{-}3_1, \ldots, 15\text{-}3_{u3}$ to collector C3 is normally high.

In FIG. 1, the central subregion $5_c$ generally bounded by the arcs $5_1$, $5_2$ and $5_3$ are relatively far from the collectors C1, C2 and C3 so that the reverse channel signal strength from all of the UU users $15\text{-}U_1, \ldots, 15\text{-}U_{uU}$ in this region to each of the collectors C1, C2 and C3 is normally weaker than for users closer to the collectors in the subregions $5_1$, $5_2$ and $5_3$.

The forward and reverse channel communications of FIG. 1 in the present invention apply to any digital radio signal system including, for example, TDMA, CDMA, SDMA and FDMA systems. If the digital radio signals of any particular system are not inherently burst structured, then some arbitrary partitioning of time into intervals may be used for processing in accordance with the present invention.

Figure 2:
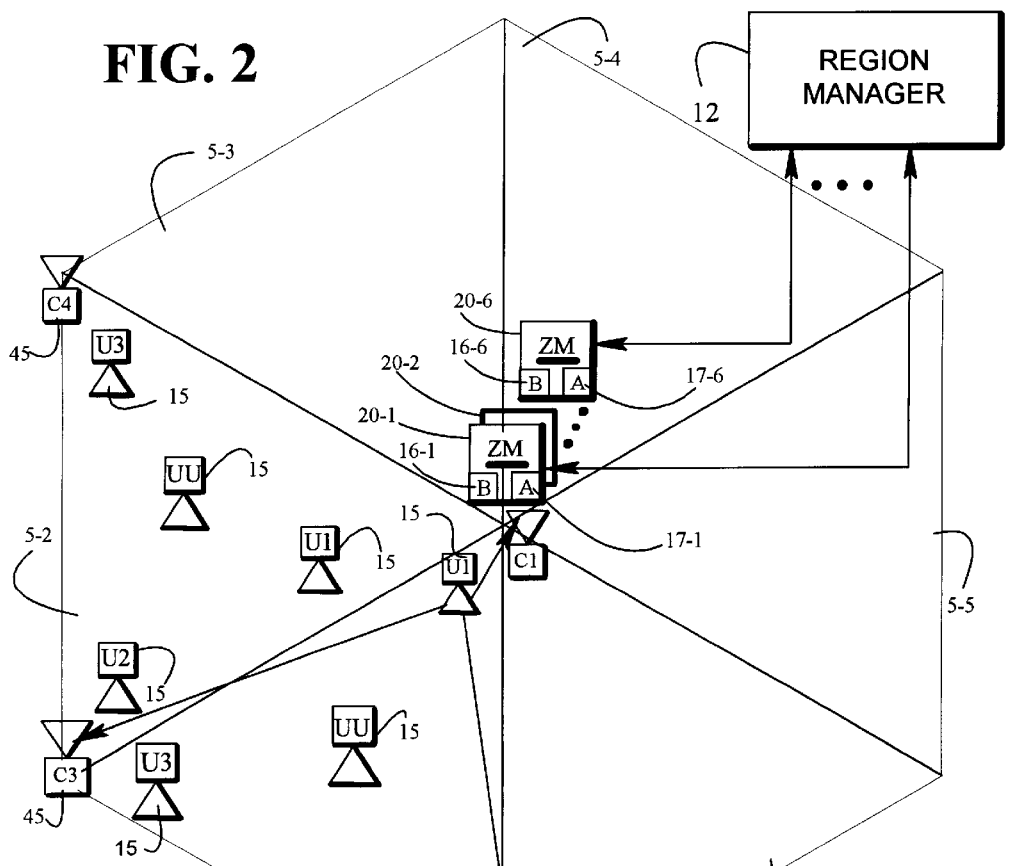
FIG. 2 depicts a representation of multiple zones of the FIG. 1 type forming a hex zone in a cellular system.
Figure 3:
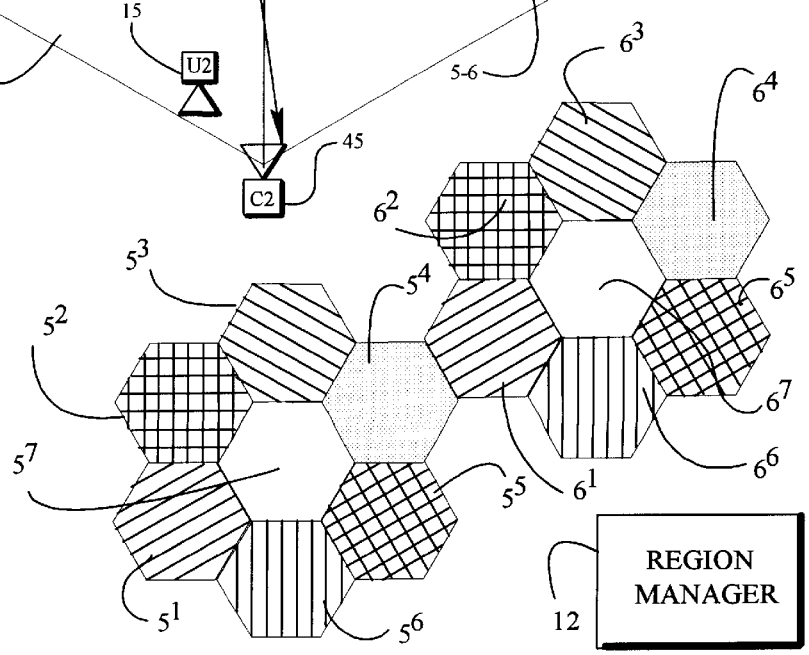
FIG. 3 depicts a representation of multiple hex zones of the FIG. 2 type.

Multiple Zone Configurations—FIG. 2 and FIG. 3

In FIG. 2, the zones 5, including the zones 5-1, 5-2, ..., 5-6, are like the zone 5 of FIG. 1 and each zone 5 includes users 15 like those for zone 5-1. For example, zone 5-2 is adjacent to zone 5-1 and includes a C4 collector 45 that operates together with at least the collectors C1 and C3 where collectors C1 and C3 also operate with zone 5-1.

In FIG. 2, the cellular system is shown having zone managers 20-1, ..., 20-6 of which zone manager 20-1 is typical. The zone managers have broadcasters 16-1, ..., 16-6, where broadcaster 16-1 is typical, that broadcast forward channel (FC) communications to multiple users 15 in one or more of the zones 5-1, ..., 5-6. Each of the users 15 transmits reverse channel (RC) communications to one or more of multiple collectors 45 including collectors C1, C2, C3 and C4, which in turn forward the reverse channel communications to aggregators 17-1, ..., 17-6, where aggregator 17-1 is typical. The zone managers 20 can be located at a base station that is configured in a number of different ways. In one configuration, each broadcaster broadcasts forward channel communications in a different one of six sectors in six different frequency ranges corresponding to the zones 5-1, 5-2, ..., 5-6. The users in the different zones transmit reverse channels on corresponding frequency ranges to the various collectors operating in their broadcast ranges and the collectors in turn forward reverse channel communications to a corresponding one of the aggregators 17. In another configuration, all of the zones use the same frequency ranges and no sectorization is employed and in such an embodiment one or more zone managers may be employed. In general, regardless of the configuration, some collector sites are associated with collectors for several zones. For example, C3 services users in two zones, 5-1 and 5-2. The backhaul link from C3 to the aggregator 17-1 is shared by users from zones 5-1 and 5-2.

In one embodiment in order to conserve bandwidth, the confidence metric bandwidth for one zone is at times reduced in order to permit an increase in the bandwidth of another zone where the zones are sharing reverse channel communication bandwidth from common associated collectors, like collectors C1 and C3 in the example described. Bandwidth control algorithms are stored and executed in each collector. Further, the zone manager 20 of FIG. 1 communicates with the processors 42 of FIG. 4 over remote interfaces when adjustments, such as for bandwidth balancing, are required.

In FIG. 2, the region manager 12 controls the bandwidth allocation of the zone managers 20-1, ..., 20-6 for the contiguous regions 5-1, ..., 5-6 and for other regions which may or may not be contiguous to the regions 5-1, ..., 5-6.

In FIG. 3, the zones $5^1, 5^2, \ldots, 5^7$ are each like the zone 5 of FIG. 2 and form a seven zone cluster. Similarly, in FIG. 3, the zones $6^1, 6^2, \ldots, 6^7$ are each like the zone 5 of FIG. 2 and form a second seven zone cluster. Any number of additional zone clusters may be provided as necessary to cover any particular region. The region manager 12 of FIG. 3 functions to control the bandwidth values of the collector reverse channels in order to balance the load among the various regions of FIG. 3 along common backhaul channels. For example, if traffic tends to move from one particular zone to another zone during certain times (such as during commute times), the bandwidth of the common backhaul channel is dynamically allocated so that the zone with higher traffic is allocated more bandwidth.

Figure 4:
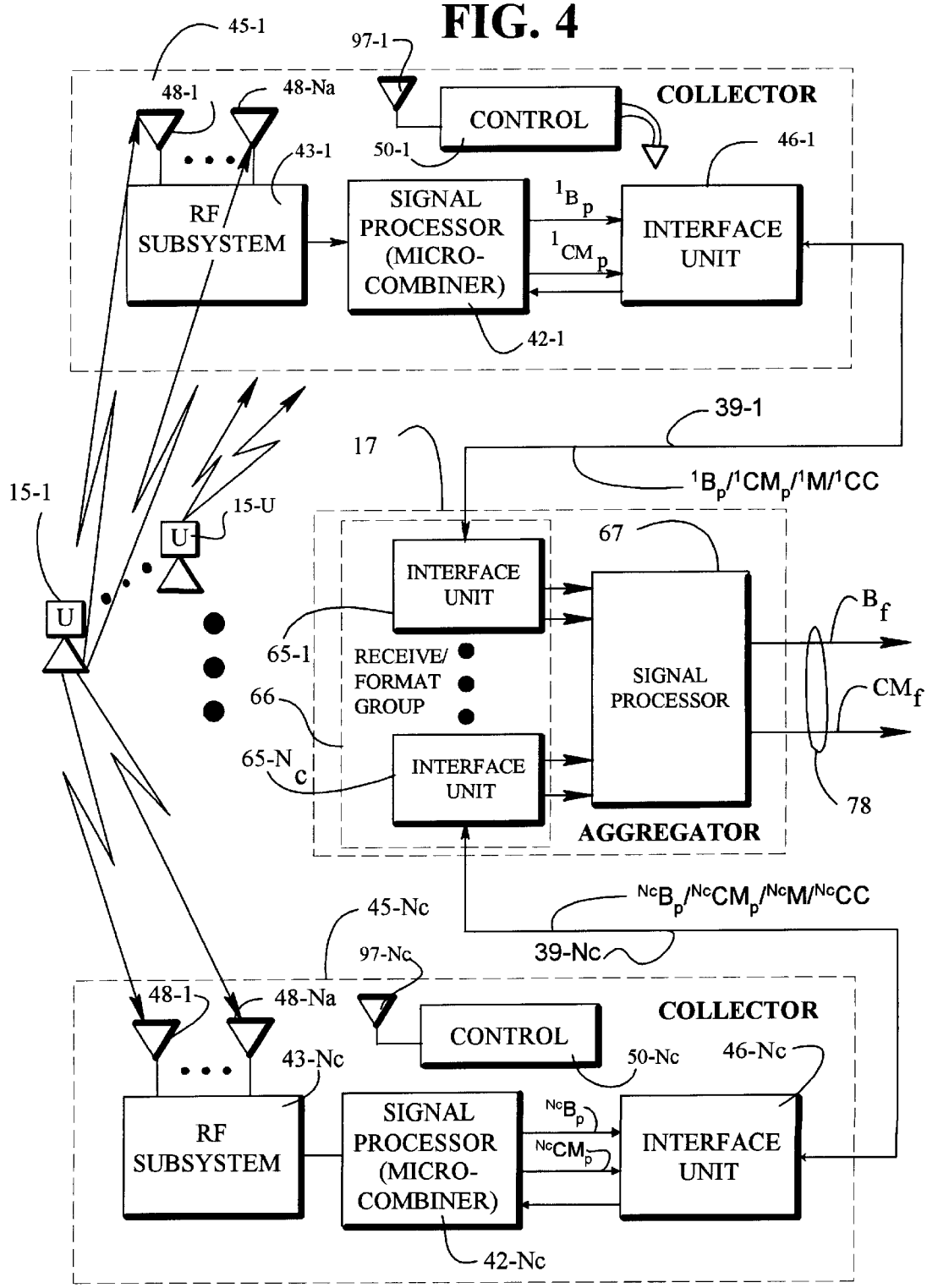
FIG. 4 depicts further details of the users, a plurality of collectors and an aggregator for the communication system of FIG. 1.

Multiple-Collector Configuration—FIG. 4

In FIG. 4, a plurality of collectors 45-1, ..., 45-Nc, like the collectors 45 in FIG. 1, each receive reverse channel communications from users 15-1, ..., 15-U. For each user 15, the collectors 45-1, ..., 45-Nc each process the received signals all representing the same communication from the user 15. These communications have macro-diversity because of the macro distances separating the collectors 45 of FIG. 1. These communications include spatially macro-diverse data bursts, $^1B_p, {}^{Nc}B_p$, and corresponding processed confidence metric vectors $^1CM_p, \ldots, {}^{Nc}CM_p$ that are forwarded to the aggregator 17 in formatted form designated as $^1B_p/^1CM_p/^1M/^1CC, \ldots, {}^{Nc}B_p/{}^{Nc}CM_p/{}^{Nc}M/{}^{Nc}CC$. The aggregator 17 combines the spatially diverse data bursts $^1B_p, \ldots, {}^{Nc}B_p$, and corresponding confidence metric vectors $^1CM_p, \ldots, {}^{Nc}CM_p$ to form a final single representation of the data burst, $B_p$, with a corresponding final confidence metric vector, $CM_f$. The aggregator 17 may use the measurement signals $^1M, \ldots, {}^{Nc}M$ and control signals $^1CC, \ldots {}^{Nc}CC$ in selecting or processing the data bursts $^1B_p, \ldots, {}^{Nc}B_p$, and/or the corresponding confidence metric vectors $^1CM_p, \ldots, {}^{Nc}CM_p$. For example, if a particular burst is associated with a poor quality signal, the particular burst may be excluded from the aggregation. The quality of a signal is measured in one example based on the channel model attenuation estimate.

In FIG. 4, the collectors 45-1, ..., 45-Nc include RF subsystems 43-1, ..., 43-Nc which have two or more micro-diversity receive antennas 48-1, ..., 48-$N_a$. The antennas 48-1, ..., 48-$N_a$ each receives the transmitted signals from each one of a plurality of users 15-1, ..., 15-U. Each representation of a received signal from a single user that is received by the RF subsystems 43-1, ..., 43-Nc connects in the form of a burst of data to the corresponding one of the signal processors 42-1, ..., 42-Nc. The received data bursts from the antennas 48-1, ..., 48-$N_a$ are represented as $^1B_r, \ldots, {}^{Na}B_r$. The signal processors 42-1, ..., 42-Nc process the plurality of received bursts for a single user to form single processed bursts, $^1B_p, \ldots, {}^{Nc}B_p$, representing the signals from the single user. The processed bursts, $^1B_p, \ldots, {}^{Nc}B_p$, have corresponding confidence metric vectors, $^1CM_p, {}^2CM_p, \ldots, {}^{Nc}CM_p$, representing the reliability of each bit of the data bursts. Each processed burst has the bits $\beta_{p1}, \beta_{p2}, \ldots, \beta_{pB}$ and the processed confidence metric vector, $CM_p$, has the corresponding processed confidence metrics $Cm_{p1}, Cm_{p2}, \ldots, Cm_{pB}$. Measurement signals, $^1M, \ldots, {}^{Nc}M$, are formed that measure the power or other characteristics of the signal. The processed bursts, the confidence metric vectors, and the measurements connect to the interface units 46-1, ..., 46-Nc which format those signals and transmit or otherwise connect them as reverse channel signals to the aggregator 17.

In FIG. 4, the signal processors 42-1, ..., 42-Nc receive timing information that permits collector signals from each collector to be time synchronized with signals from each of the other collectors. For example, each collector may have a global positioning system (GPS) receiver (not shown) for receiving a time synchronization signal. Alternatively, or in addition, the zone manager 20 of FIG. 1 can broadcast or otherwise transmit time synchronization information. The signal processors 42-1, ..., 42-Nc provide time stamps in collector control signals $^1CC, \ldots, {}^{Nc}CC$ that are forwarded from interface units 46-1, ..., 46-Nc as part of the reverse channel signals to the aggregator 17.

In FIG. 4, a block diagram representation of the aggregator 17 is shown. The aggregator 17 includes a receive/format group 66 which operates to receive and format signals transmitted by the collectors 45. The received signals $^1B_p/^1CM_p/^1M/^1CC, {}^2B_p/^2CM_p/^2M/^2CC, \ldots, {}^{Nc}B_p/^{Nc}Cm_p/{}^{Nc}M/^{Nc}Cc$, after formatting are connected to the signal processor 67 which processes the received signals for macro-diversity combining. The format group 66 uses the time stamp and other control code (CC) information to align the signals from different collectors for the same user. More specifically, the unit 66 for each one or more bursts compares and aligns the time stamps from the control fields $^1CC, {}^2CC, \ldots, {}^{Nc}CC$ so that the corresponding data, confidence metric and measurement signals from different collectors, for the same common burst from a user are aligned.

The signal processor 67 for the aggregator 17 processes the burst signals from each user and the $N_c$ representations of the reverse channel signal from the user as received through the $N_c$ active collectors 45. The $N_c$ data, metric and measurement values for a single user include the data and processed confidence metric pairs $[^1B_b, {}^1CM], [^2B_b, {}^2CM_p], \ldots, [^{Nc}B_b, {}^{Nc}CM_p]$ and the measurement values, $^1M, {}^2M, \ldots, {}^{Nc}M$. The processed confidence metrics, $^1CM_p, {}^2CM_p, \ldots, {}^{Nc}CM_p$ are processed to form the aggregator processed confidence metrics, $^1CM_{pp}, {}^2CM_{pp}, \ldots, {}^{Nc}CM_{pp}$.

Figure 5:
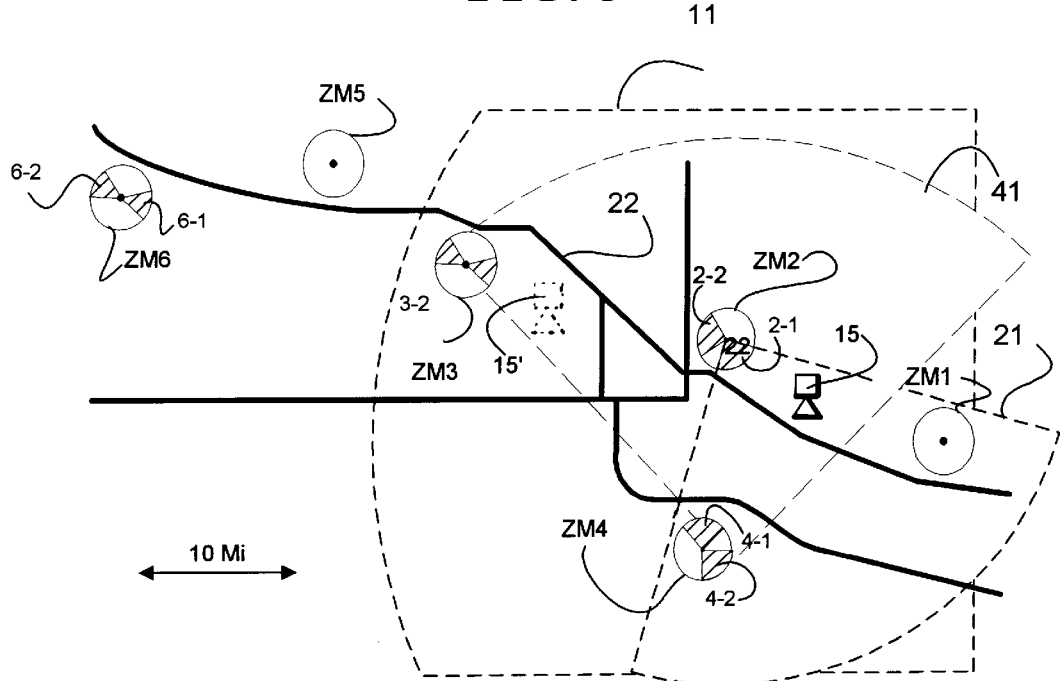
FIG. 5 depicts a block diagram representation of a region of collectors co-sited with zone managers.

Co-sited Collectors—FIG. 5

FIG. 5 shows an embodiment in which the collectors 45 are co-sited with the broadcasters 16 and aggregators 17 of zone managers 20 of FIG. 2. In FIG. 5, six zone managers ZM1, ZM2, ZM3, ZM4, ZM5 and ZM6 are distributed over a community where the mobile users tend to be concentrated along the roadways 22 (designated by bold lines). The zone managers ZM1 and ZM5 are omni-directional and the zone managers ZM2, ZM3, ZM4 and ZM6 are sectorized. The zone manager ZM2 has sectors 2-1 and 2-2, the zone manager ZM3 has sectors 3-1 and 3-2, the zone manager ZM4 has sectors 4-1 and 4-2 and the zone manager ZM6 has sectors 6-1 and 6-2. Each sector has a broadcaster 16 (not shown) and a pair of micro-diverse collectors 45 (not shown) for broadcasting and receiving over a sector zone. For example, the sector zone 21 for sector 2-1 of zone manager ZM2 and the sector zone 41 for sector 4-1 of zone manager ZM4 are shown by way of example in FIG. 5. Also, zone 11 is partially shown in FIG. 5 representing the omni-directional zone of zone manage ZM1. A user 15 receives broadcasts, for example, from anyone of the zone managers ZM1, ZM2 or ZM4. A particular one of the zone managers ZM1, ZM2 or ZM4 is selected as the active one for the user 15 and that active zone manager broadcasts on a unique forward broadcast channel. The user 15 in turn broadcasts on a corresponding reverse channel. The zone managers ZM1, ZM2 and ZM4 each include micro-diverse collectors for receiving the user broadcasts regardless of which one of the broadcasters from the zone managers ZM1, ZM2 or ZM4 is active for the particular user.

When user 15 moves to a new location as shown by 15', the zone managers ZM1, ZM2 and ZM4 may or may not hand-off the broadcast frequency from one zone manager to another, For example, in moving from the user 15 location to the user 15' location, if the broadcaster for zone manager ZM4 is active, then that broadcaster may remain active even though the user 15 moves. If the broadcaster forward channel remains the same, then the user 15 reverse channel remains the same. However, the collector group receiving the reverse channel may change. For example, at the user 15 location, the active collectors can be collectors for sector 2-1 of ZM2, sector 4-1 of ZM4 and collectors for ZM1. At the user 15' location, the active collectors may be from sector 2-2 of ZM2, sector 3-1 of ZM3 and sector 4-1 of ZM4.

In another example, in moving from the user 15 location to the user 15' location, if the broadcaster for zone manager ZM2 sector 2-1 is active, then the broadcaster for one zone manager may change with a hand-off to the broadcaster for another zone manager as a result of the user 15 move. If the broadcaster forward channel changes, then the collector reverse channel correspondingly changes and the collector group receiving the user reverse channel changes frequency. For example, at the user 15 location, the active collectors can be collectors for sector 2-1 of ZM2, sector 4-1 of ZM4 and collectors for ZM1 at one reverse channel frequency. At the user 15' location, the active collectors may be from sector 2-2 of ZM2, sector 3-1 of ZM3 and sector 4-1 of ZM4 at a different reverse channel frequency than for the user at the user 15 location.

Figure 6:
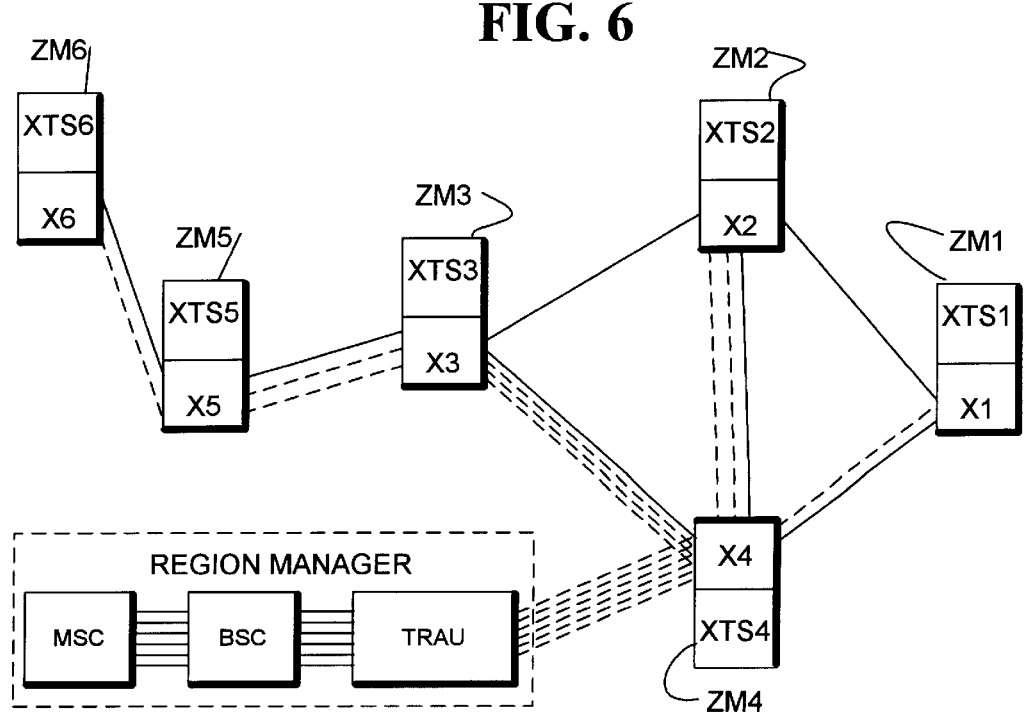
FIG. 6 depicts a block diagram representation of a zone manager communication layout for the region of FIG. 5.

Communication Layout for FIG. 5 Region—FIG. 6

In FIG. 6, the communication layout for the region of FIG. 5 is shown. Each zone manager includes an XTS unit with a processor and T1 communications and an X unit with information packet (IP) routing facilities. In the embodiment shown, the communications for the region are between the region manager and the zone manager ZM4 which in turn relays information for the other zone managers.

Figure 7:
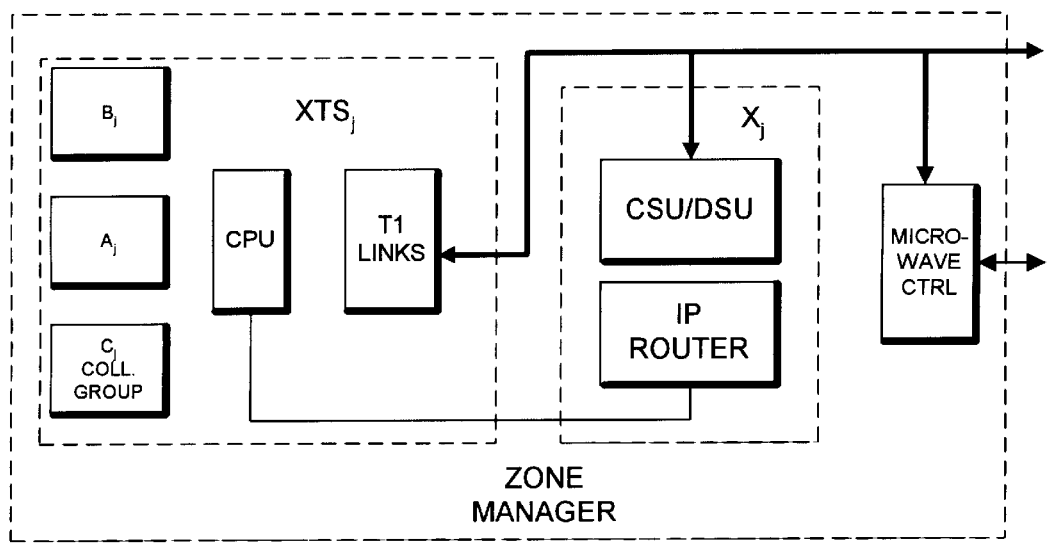
FIG. 7 depicts a block diagram representation of typical zone manager.

Typical Zone Manager—FIG. 7

In FIG. 7, further details of a typical zone manager of FIG. 5 and FIG. 6 are shown. Each zone manager includes a broadcaster $B_j$ an aggregator $A_j$ and a collector group $C_j$. The collector group for zone manager ZM4 includes for sector 4-1 a micro-diverse collector pair at zone manager ZM4, the micro-diverse collector pair at ZM2 for sector 2-1, and a micro-diverse collector pair at ZM1. The collectors in a group are maco-diverse in that they are located at the macro-diverse locations of the different zone managers.

Figure 8:
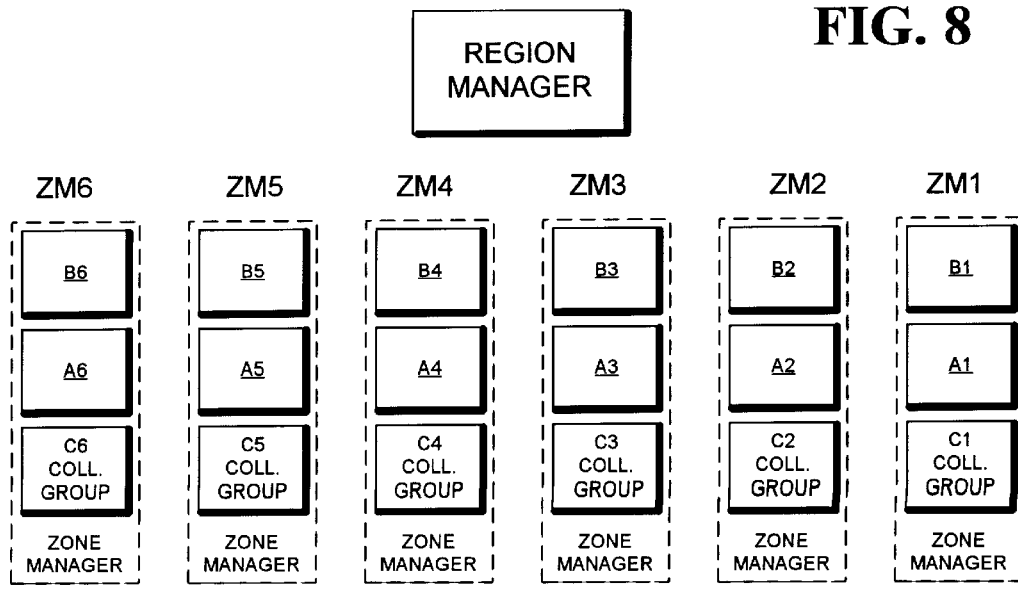
FIG. 8 depicts a region manager and constituent zone managers and their primary resources.

Zone Manger of FIG. 5 Region—FIG. 8

In FIG. 8, the zone managers ZM1, ..., ZM6 are shown each with a broadcaster, an aggregator and a collector group where each collector group is formed of maco-diverse collectors including collectors at other ones of the zone managers. The collector groups for the zone managers ZM6, ..., ZM1 have the zone manager collector aggregation as shown in the following TABLE 1.

| Zone Manager Collector Group | Zone Manger Aggregation |
|---|---|
| 6 | 6, 5 |
| 5 | 6, 5, 3 |
| 4 | 4, 2, 1 |
| 3 | 5, 3, 2 |

| Zone Manager Collector Group | Zone Manger Aggregation |
|---|---|
| 2 | 4, 2, 1 |
| 1 | 4, 2, 1 |

Figure 9:
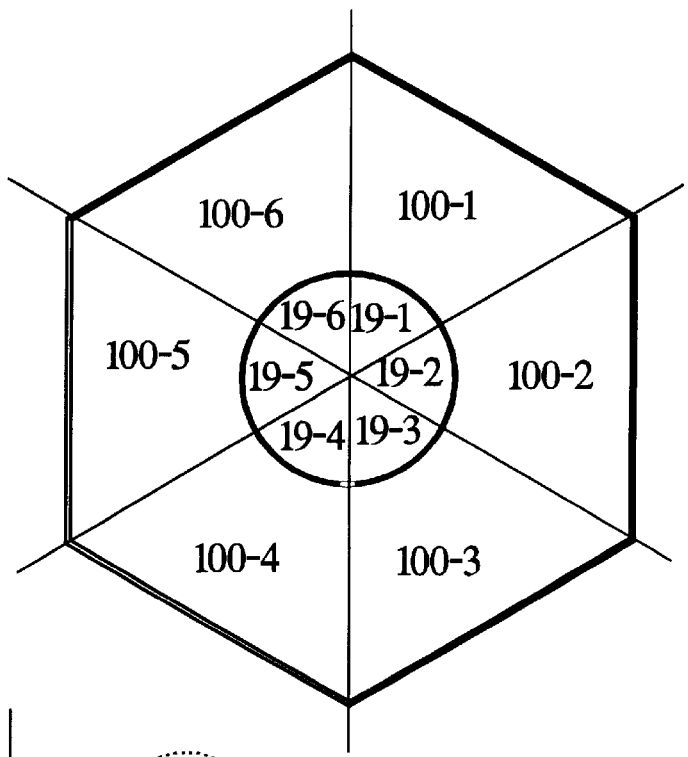
FIG. 9 depicts a typical sectorized region manager.
Figure 10:
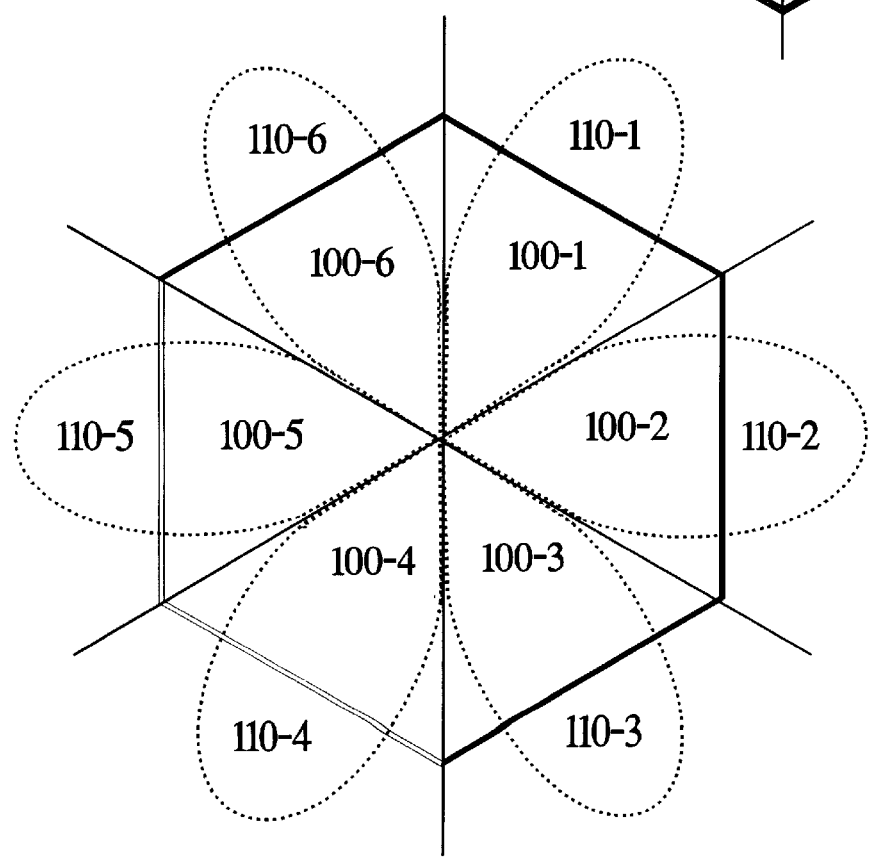
FIG. 10 depicts the collector antenna pattern of the sectorized region manager of FIG. 9.

Colocated Collectors—FIG. 9 and FIG. 10

In FIG. 9, a sectorized zone manager is shown including the six sectors 100-1, 100-2, . . . , 100-6 having sectorized trnscievers 19-1, 19-2, . . . , 19-6. In FIG. 10, the six sectors 100-1, 100-2, . . . , 100-6 each have antenna patterns for the collectors 110-1, 110-2, . . . , 110-6.

Because aggregation is both a selection and a signal combining process, the present invention provides reverse channel gain through the ability to divide the served area into smaller sectors, apply higher gain antennas to this area, have each antenna connect to a collector located in the zone manager XTS, and then have all of the collector inputs sent to an aggregator also located in the zone manager XTS.

In cases when the mobile subscriber is directly in the sectored reverse channel, a collector should detect the signal and send a good signal to the aggregator. The aggregator can first determine if any of the signals it has been sent are good, and if so, selects the signal and decodes it. It performs this qualification and selection process in order to avoid degrading the signals by adding noise from other collectors. In this way, the aggregator acts as a selector and switching mechanism and picks from the best collector associated with the direction of the mobile subscriber being served.

In the cases when the mobile subscriber is between the 3 dB lobes of the receiving antennas, two or more collectors detect weaker signals from the mobile subscriber. This signal may not be good-enough to be simply selected by the aggregator algorithms. But by combining these two signals together, an improved version should emerge (assuming other combining of the other sectors with noise do not mess this up).

The goal of the configuration is to use the narrowest antennas (which provide the highest gains) so that the system works robustly and delivers coverage performance. If there are problems associated with the mobiles when of the 3 dB lobes, then wider antennas (hence lower gain) should be used in the reverse channel sectoring process so that the system is robust.

This configuration simply maps collector inputs to the signal aggregator within the same XTS. This means that the architecture of the Voyager system is NOT changed, rather this is a subset of sending collector signals to aggregators from remote/neighboring XTSs over Um-bis connections via T1/E1 links. The asymmetry of the architecture and the multi-receive, signal selection/combining aspects of the collector, aggregator scheme remain.

This configuration is more appropriate when edge conditions or low-shadow variations exist in the cell areas to be covered. Other systems cannot derive these coverage gains without engineering new mutli-receive, high-powered downlink equipment. The coverage advantages relative to conventional transceivers are associated with better signal detection capabilities due to higher-gain antennas and signal swithching and/or combining on the reverse channel and higher-powered transmission equipment employed on the downlink.

This advantage applies to all conditions of the cell terrain—high shadow variations and low shadow variations for rf signals. In high shadow variations, a macro-diverse configuration may derive more net gains vs. the competition than this configuration due to a lower relative shadow fade reserve required in the system link budget vs. competitor's system link requirements. None-the-less, the cell array configuration should still out perform conventional transceivers by the difference in the reverse channel and downlink antenna gains regardless of the shadow variance—as both will suffer the same consquences as the terrain varies, with the cell array providing higher gains in the receive direction The equipment costs of this configuration are comparable (on average) to the macro-site configuration, in that the same number of collectors, aggregators and larger downlink power amplifiers are used. More antennas and cables are used than the macro-site configuraiton, but less T1/E1s are required because there are no remote collectors or aggregators to serve.

From an operations cost, there is no Um-bis backhaul associated with this configuration, making it less costly for an operator to run the Voyager network.

Finally, from a development perspective, this configuration must be tested, but this equipment configuration is not architecturally different from what we are already engineering today—and can be said to use aggregation without requiring the complex Um-bis protocol to work.

Although the present invention may require more antennas on the tower-top or roof-top, and this could look like an antenna-farm which is not attractive. These narrower antennas will have to be more carefully aligned vs. a small number of wide antennas which have higher margins of error. Also, a number of collectors are used to detect a mobile's signal, and in many conditions, some of the collectors are employed on a fruitless mission. In certain situations, it may be desireable to spend more on antennas, cables and to locate the additional collectors inside an edge XTS so that additional zone manager sites and equipment will not have to be developed. The costs of this additional equipment are certainly less than the costs to provide entirely new XTS enclosures, equipment, site overhead costs, etc.

While the invention has been particularly shown and described with reference to preferred embodiments thereof it will be understood by those skilled in the art that various changes in form and details may be made therein without departing from the spirit and scope of the invention.

What is claimed is:

1. A communication system having a plurality of forward channel communications and a plurality of corresponding reverse channel communications comprising, a region manager means for communicating said plurality of forward channel communications and a plurality of corresponding reverse channel communications in a region, a plurality of zone manager means in said region each including,
      broadcaster means having a broadcaster transmitter for broadcasting said plurality of forward channel communications using broadband broadcaster signals to form a plurality of broadcaster forward channels,
      aggregator means for processing reverse channel communications,
      a plurality of collector means for receiving reverse channel communications and forwarding reverse channel communications to said aggregator means, a plurality of users, each of said users including user receiver means for receiving a different forward channel from said broadcaster means and including user transmitter means for broadcasting user reverse channel communications in a different user reverse channel, the improvement characterized by:
- each of said zone manager means associated with a different group of said plurality of collector means including collector means from other ones of said zone manager means,
- said broadcaster means broadcasting said plurality of broadcaster forward channels in a broadcaster zone,
- said plurality of users, located in said broadcaster zone, for providing a plurality of different user reverse channels collectively as a broadband composite signal,
- a plurality of said collector means co-located with said broadcaster means so that each of ones of said plurality of collector means is active to receive said composite signal over at least a portion of said broadcaster zone and so that user reverse channels for some ones of said plurality of users are received by two or more of said collector means,
  - each of said collector means including broadband collector receiver means for receiving said broadband composite signal with reverse channel communications from ones of said plurality of users, and
  - each of said collector means including collector forwarding means for forwarding, to said aggregator means, said user reverse channel communications from said ones of said plurality of users as collector reverse channel communications,
- said aggregator means for a zone manager means receiving said collector reverse channel communications from said collector means of a group to provide said corresponding reverse channel communications for each of said ones of said plurality of users as a combination of the collector reverse channel communications from said collector means of a group.

2. The communication system of claim 1 including a region manager means for communicating between a network and a region with a plurality of network forward channel communications from the network to said broadcaster means and with a plurality of corresponding network reverse channel communications to the network from said aggregator means.

3. The communication system of claim 1 wherein a plurality of sectors are present, each of said zone manager means is for a different sector and a particular user is one of said users and travels from a first one of said sectors to a second one of said sectors and wherein said region manager means includes control means for assigning a first broadcaster forward channel and a first user reverse channel for said particular one of said users for both said first and said second sectors.

4. The communication system of claim 1 wherein, for one of said zone manager means collectors means are co-located with said broadcaster means for said one of said zone manager means and wherein other collectors means are located at macro-diverse locations from said one of said zone manager means.

* * * * *